G. L. DANFORTH, Jr.
REGENERATOR.
APPLICATION FILED MAY 22, 1914.
1,140,125.
Patented May 18, 1915.
3 SHEETS—SHEET 1.
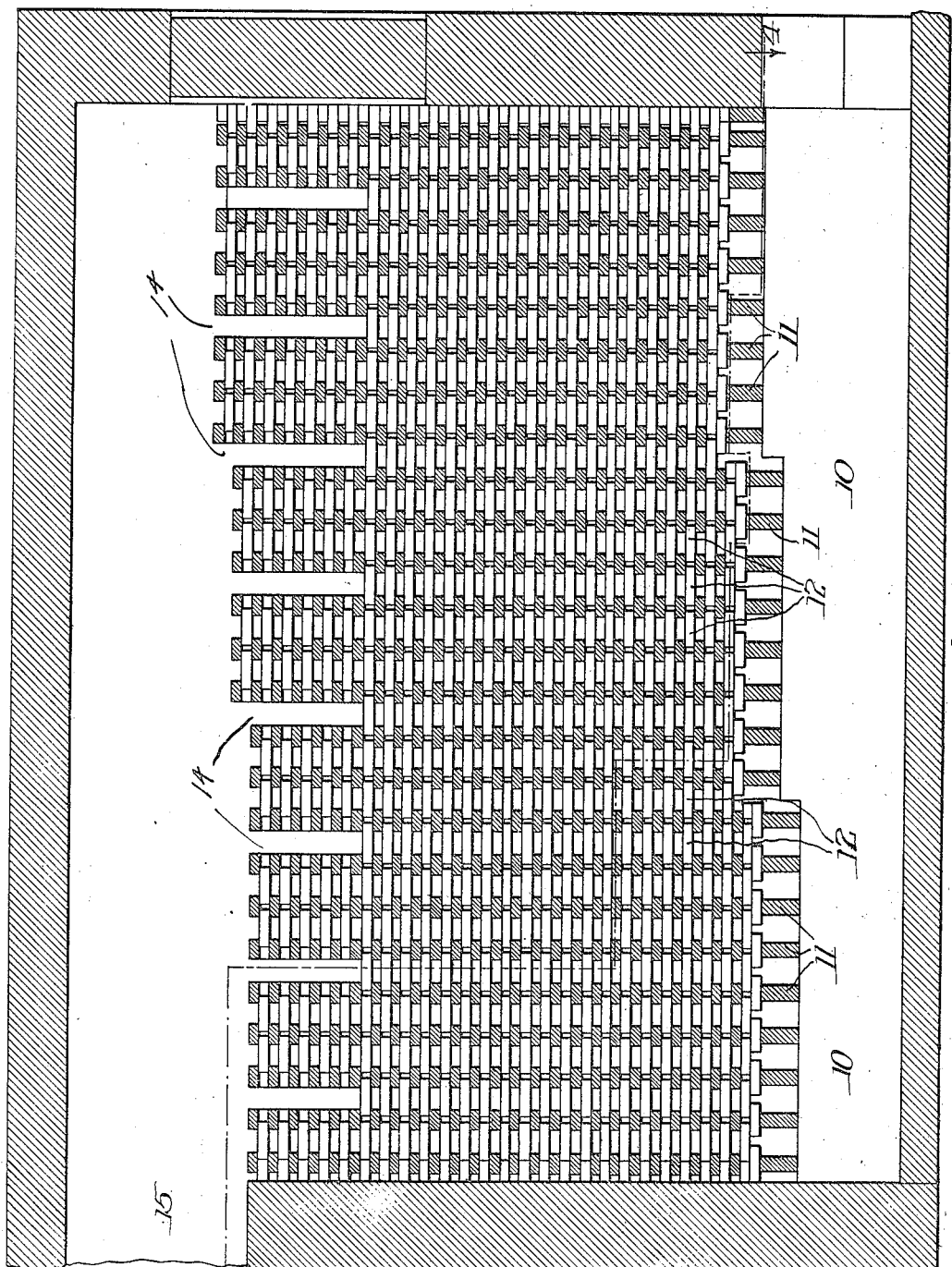

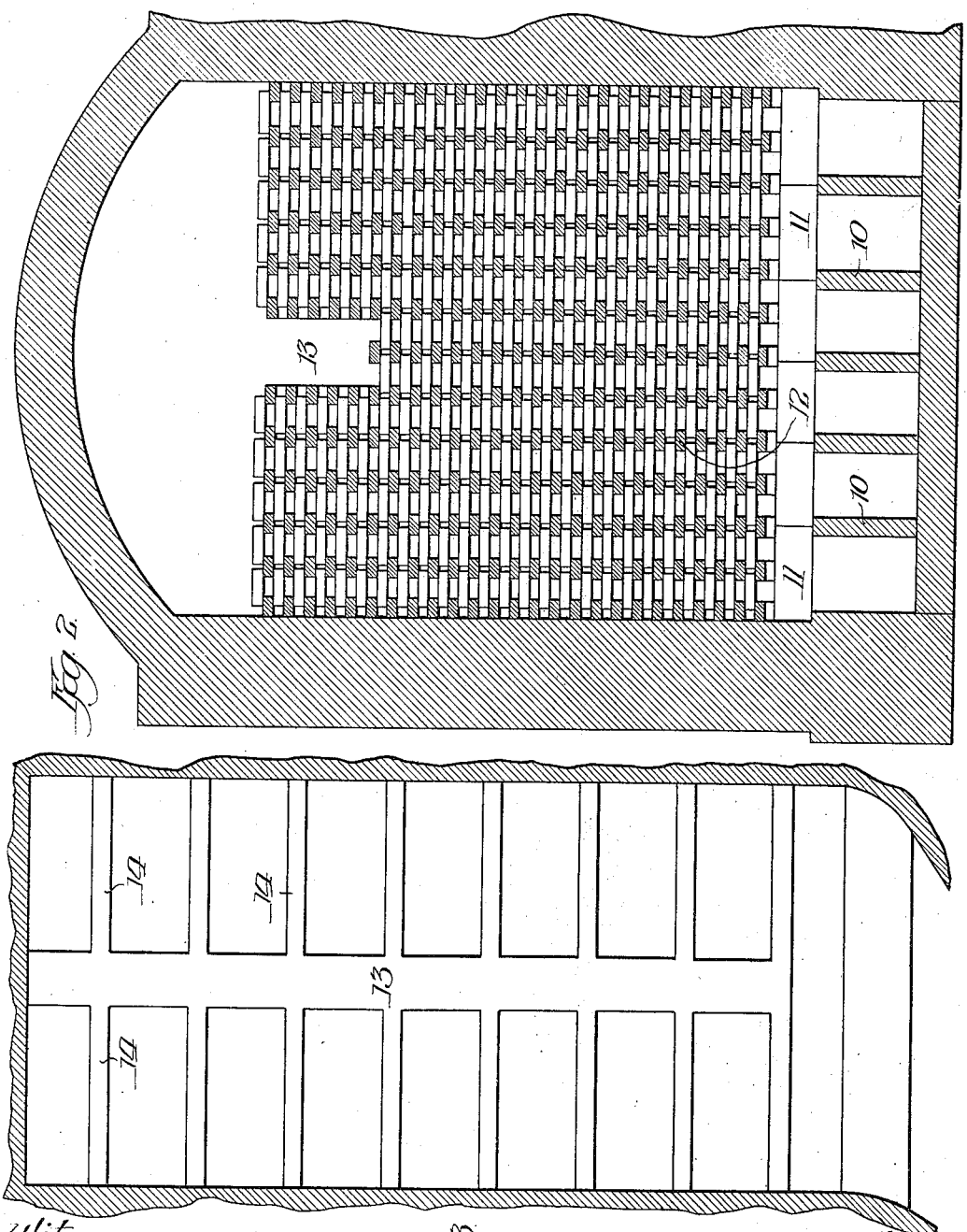

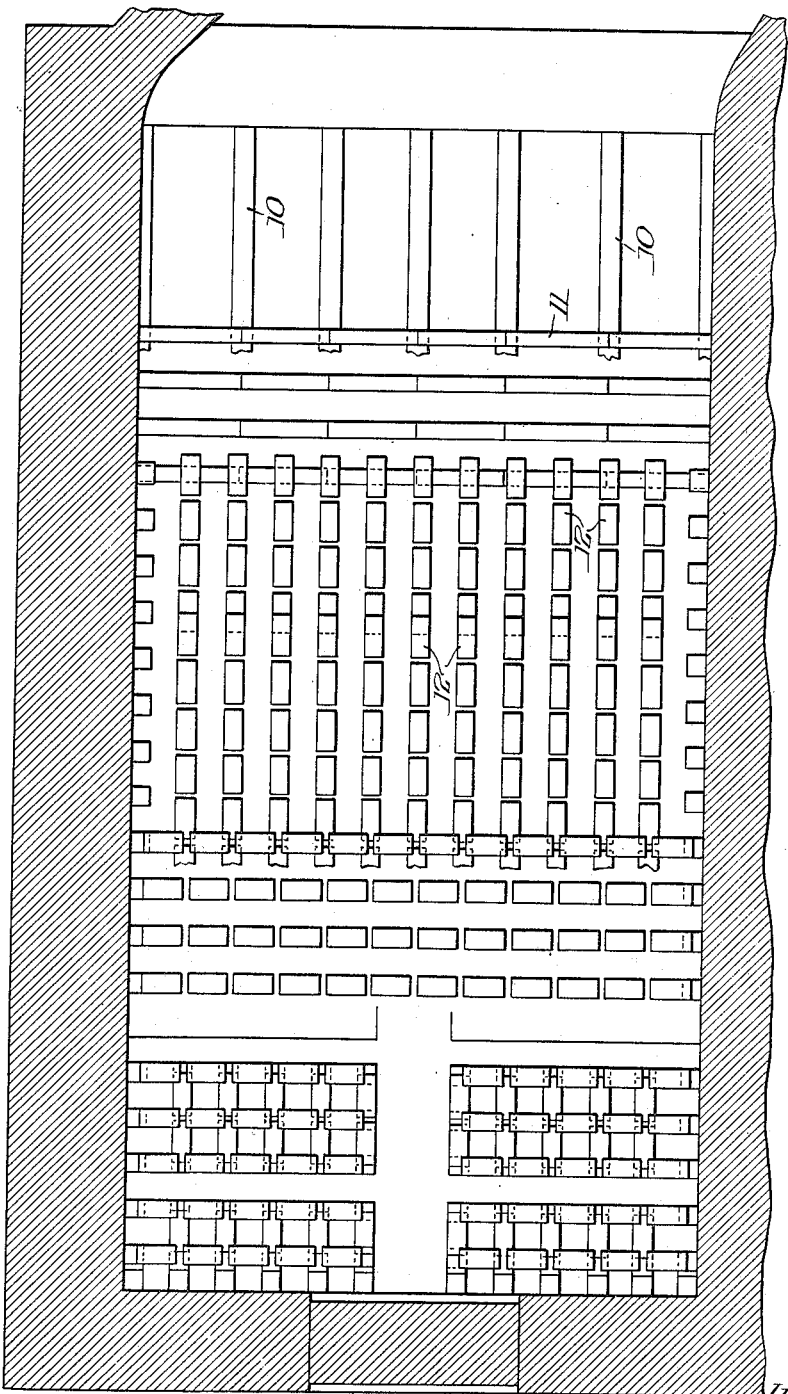

UNITED STATES PATENT OFFICE.

GEORGE L. DANFORTH, JR., OF SOUTH CHICAGO, ILLINOIS.

REGENERATOR.

1,140,125.          Specification of Letters Patent.          Patented May 18, 1915.

Application filed May 22, 1914. Serial No. 840,148.

*To all whom it may concern:*

Be it known that I, GEORGE L. DANFORTH, Jr., a citizen of the United States, residing at South Chicago, in the county of Cook and State of Illinois, have invented certain new and useful Improvements in Regenerators, of which the following is a specification.

My invention relates to regenerators and has particular reference to a novel device of this sort adapted for use in connection with heating and melting furnaces.

The object of this invention is to provide in a regenerating chamber of any dimensions an arrangement of the regenerating bricks that will maintain to highest efficiency the three features essential to a maximum heat regeneration conducive to the efficient and economical operation of the furnace.

The three essential features for such heat regeneration are: 1st. To contain in the regenerating chambers as great a possible mass or number of bricks to provide maximum storage for the heat units taken from the outgoing hot waste gases to be later transferred to the incoming cold air or gases. 2nd. To give the mass or number of bricks contained in the chambers, a maximum surface exposed in such a way as to come in intimate contact with the gases and air, thereby facilitating the transfer of the heat units from the outgoing hot waste gases to the brick, and in turn from the bricks to the incoming cold air or gases. 3rd. To provide passageways or flues through the regenerating bricks sufficiently large in area for the necessary passage of the outgoing and incoming air and gases. And also not so large that the hot waste gases can channel through a part of the passage ways or flues and escape without coming in contact with sufficient brick mass and surface for the proper transfer of heat units to the incoming cold air or gases that possibly may channel through another part of the passageways or flues if too large.

A correct combination of the three essential features would not be such a difficult problem if the passageways or flues would remain of same area as when installed.

To those skilled in the art it is known that during the operation of heating or melting furnaces there is gathered a deposit of iron oxid and miscellaneous material upon the brick immediately forming the passageway or flue entrances nearest to the combustion chamber from which come the hot waste gases. This deposit more or less rapidly decreases the entering area of each and every passageway or flue. Provided there has been no sacrifice of brick mass or exposed surface and the passageways or flues installed with area just sufficient for the necessary passage of air and gases before the deposit is made then the passageways or flues become too small locally where deposit is made and the operation of the furnace seriously impaired by loss of draft; otherwise if the passageways or flues when first installed are made large enough to avoid this later loss of furnace draft it must be done at a sacrifice of brick mass or exposed surface and the passageways or flues are then too large when furnace is first put in operation and allow the outgoing hot gases to channel and escape without coming in contact with sufficient brick mass and surface to afford proper regeneration for the incoming cold air and gases.

It may be said that heretofore in order to maintain a sufficient furnace draft it has been necessary to decrease the brick mass, (heat storage capacity) and the exposed brick surface, (absorbing and radiating facilities,) thereby impairing the heat regeneration required for fast and economical furnace operation. Impairing the heat regeneration in a heating or melting furnace induces a slower working unit and with a decreased production materially adds to the fuel and other operating expenses. Impairment or loss of furnace draft has a similar result with also a strong tendency to scatter the flame in combustion chamber with an increased destruction to the refractory walls and metal binders of the furnace.

As before stated, the deposit is largely confined locally to that end of the passageways or flues through which enter the outgoing hot waste gases, and these entrances at passageway or flue ends become seriously obstructed when the remainder of passageway or flue is comparatively clean and in condition to allow the proper passage of the air and gases.

By my invention it is made possible, first to contain the maximum brick mass or number of bricks necessary for heat storage; secondly, to provide a maximum surface exposed facilitating the transfer of heat to and from the bricks; and thirdly, to provide passageways or flues for the passage of air and gases that are the correct size for the furnace when first put in operation, and that will still afford a comparatively free passage for the air and gases after the deposits have gathered in the passageway or flue ends as before described. To accomplish this result I introduce and locate in proper combination with the outgoing entrances of small passageways or flues, a series of comparatively large passageways through which the outgoing hot gases can enter approximately sixty per cent. of the small passageways or flues by side entrances provided at right angles to the original entrance. These side entrances are made possible by the large passageways. The arrangement of the large passageways also protects the original entrance to the remaining forty per cent. of small passageways or flues in such a manner that the deposit of iron oxid, etc., is much less rapidly formed at these particular entrances.

By the means as just described and as illustrated in drawing, it is made possible to maintain for a much greater period of time the necessary furnace draft with no sacrifice of the mass of brick necessary for proper heat storage.

Having provided the necessary brick mass and the required passageways or flues it remains to arrange the units of the brick mass in such a manner as to give sufficient exposed brick surface in order to facilitate the rapid transfer of heat to and from storage, and also of such construction that the bricks have the necessary stability to remain in position as arranged. To accomplish this purpose I use preferably, for reasons later described, a size of brick known to the trade as standard 9″ brick, having dimensions of 9″x4.5″x2.5″. These bricks arranged as shown in drawing are exposed on all sides, top, bottom, and end, and have 88 per cent. of their total surface exposed to the air and gases. All brick on account of resting on their flat sides have a low center of gravity and secure bearing on every corner. This insures permanent stability.

The reasons for preferring a 9″ standard brick, are, first: when using a 10.5″ center and with the brick ends 1.5″ apart the passageways or flues are made 6″x6″, which is a size very largely used; second: their larger ratio of surface as compared to any thicker shape; third: they are the cheapest shape to purchase, are always in stock and after being used and discarded for regenerating purposes may be applied with good value to other purposes that would be impossible with special shaped brick.

In summing up the improved arrangement of the regenerating bricks, it is clearly evident that by the introduction of the large passageways, located in proper combination with that end of small flues where the deposit is made, additional flue entrances are made and passageway provided for the air and gases to and from the additional entrances. Therefore, in order to maintain the furnace draft it is now not necessary to install passageways and flues too large at a sacrifice of the mass of brick (heat storage capacity); furthermore by the method of placing the bricks as has been described and shown in drawing, it is made not only possible to very largely increase the mass of brick but also to very greatly increase the exposed surface of each brick which decidedly facilitates the rapid transfer of heat to and from storage. Having increased the efficiency of all the essential features of this heat regeneration it will be evident to those familiar with the art that the heating or melting furnaces will operate much more efficiently producing a larger tonnage at a decreased cost for fuel and other operating charges per ton of product.

My invention will be more readily understood by reference to the accompanying drawings wherein:

Figure 1 is a longitudinal section through a regenerator constructed in accordance with my invention; Fig. 2 is a transverse, vertical section through the same; Fig. 3 is a top plan view showing the arrangement of channels or passageways, and, Fig. 4 is a section taken on the line 4—4 of Fig. 1.

Referring more particularly to the drawings it will be seen that on suitable foundation piers 10 are located tiles 11, which support the bricks 12, constituting the regenerator. These bricks as shown, are laid in a peculiar manner; that is, they are laid flatwise and as best shown in Fig. 4, only the corners of the bricks are in engagement. This result is secured merely by spacing apart the bricks in their end to end relation. This result could not be satisfactorily secured unless the bricks were laid flatwise inasmuch as a stable structure would not result. The advantage in such arrangement of the bricks is in that a much greater radiating surface is presented. At the top of the regenerator I provide a longitudinal channel 13, as indicated in Figs. 2 and 3, extending downward into the brickwork substantially a quarter of the height of the regenerator. This channel is intersected at intervals by the lateral channels 14, of similar depth but of less width than the channel 13. If desired the height of the regenerator brickwork may be increased from the point of entrance 15 of the furnace flue to the opposite end. By the provisions of the channels referred to I eliminate to a large extent the congestion of the checkerwork due to deposition of solid products of combustion. When the checkerwork is first installed the gases will take their usual course through the bricks; after a time the upper bricks and those underneath which are in a line between the entrance and exit of the regenerator will become fouled to a certain extent making the passage of gases therethrough somewhat difficult. In such case the gases will short circuit through the upper portion of the brickwork by means of the channels 13, 14, thus passing through a portion of the checkerwork not theretofore extensively used.

It is obvious that the form and arrangement of the channels may be varied, also that other modifications may be made all without departing from the spirit of my invention.

I claim:

1. In a regenerator, bricks forming checkerwork, said bricks being laid on their flat sides and with their adjacent ends separated to leave a material passageway therebetween, substantially as described.

2. In a regenerator, bricks forming checkerwork, said bricks being laid on their flat sides and with their adjacent ends separated to leave a material passageway therebetween whereby said bricks in alternate courses are laid with their corners only in engagement, substantially as described.

3. In a regenerator having checkerwork, a course of bricks laid flatwise with their ends separated, and a second course of bricks laid flatwise and at right angles to the first course, the ends of the bricks in said second course likewise being materially separated whereby said checkerwork is built up with bricks the corners of which are in engagement, substantially as described.

4. A regenerator having checkerwork and provided with a main channel leading thereto and with an auxiliary passage communicating with said main channel and with the body of the checkers at a point removed from the point of the gas inlet whereby additional entrance is provided to the adjacent checker flues, substantially as described.

5. A regenerator having checkerwork provided with a longitudinal channel, and with a plurality of transverse channels, substantially as described.

6. A regenerator having checkerwork provided with a main channel leading thereto and an auxiliary passage communicating with said main channel, terminating within the body of the checkers and surrounded by the checkerwork thereby providing to the adjacent flues additional entrance through which the waste gases are directed when the original entrance to the flues is fouled with deposit, substantially as described.

GEO. L. DANFORTH, Jr.

Witnesses:
Wm. A. Field,
W. J. Mohr.